United States Patent
Ma et al.

(10) Patent No.: US 10,313,456 B2
(45) Date of Patent: Jun. 4, 2019

(54) MULTI-STAGE FILTERING FOR RECOMMENDED USER CONNECTIONS ON ONLINE SOCIAL NETWORKS

(71) Applicant: Facebook, Inc., Menlo Park, CA (US)

(72) Inventors: Xingyu Ma, Fremont, CA (US); Tin Shing Ma, San Mateo, CA (US); Xiaofan Yang, Fremont, CA (US)

(73) Assignee: Facebook, Inc., Menlo Park, CA (US)

( * ) Notice: Subject to any disclaimer, the term of this patent is extended or adjusted under 35 U.S.C. 154(b) by 365 days.

(21) Appl. No.: 15/365,532

(22) Filed: Nov. 30, 2016

(65) Prior Publication Data
US 2018/0150464 A1  May 31, 2018

(51) Int. Cl.
*G06Q 50/00* (2012.01)
*H04L 29/06* (2006.01)
*H04L 29/08* (2006.01)

(52) U.S. Cl.
CPC .......... *H04L 67/20* (2013.01); *G06Q 50/01* (2013.01); *H04L 67/26* (2013.01); *H04L 67/306* (2013.01); *H04L 67/42* (2013.01)

(58) Field of Classification Search
CPC ......... G06F 17/30867; G06F 17/30675; H04L 67/20; H04L 67/26; H04L 67/306; H04L 67/42; G06Q 50/01
See application file for complete search history.

(56) References Cited

U.S. PATENT DOCUMENTS

| | | |
|---|---|---|
| 5,918,014 A | 6/1999 | Robinson |
| 6,539,232 B2 | 3/2003 | Hendrey |
| 6,957,184 B2 | 10/2005 | Schmid |
| 7,069,308 B2 | 6/2006 | Abrams |
| 7,379,811 B2 | 5/2008 | Rasmussen |
| 7,539,697 B1 | 5/2009 | Akella |
| 7,752,326 B2 | 7/2010 | Smit |
| 7,783,630 B1 | 8/2010 | Chevalier |
| 7,797,635 B1 | 9/2010 | Denise |
| 7,836,044 B2 | 11/2010 | Kamvar |
| 7,840,589 B1 | 11/2010 | Holt |
| 8,024,328 B2 | 9/2011 | Dolin |
| 8,027,990 B1 | 9/2011 | Mysen |
| 8,055,673 B2 | 11/2011 | Churchill |

(Continued)

*Primary Examiner* — Jorge A Casanova
(74) *Attorney, Agent, or Firm* — Baker Botts L.L.P.

(57) ABSTRACT

In one embodiment, a method includes identifying a first set of candidate-users. Each candidate-user corresponds to a second user within a threshold degree of separation of a first user within a social graph. The method includes filtering, using a first-stage filtering model, the first set of candidate-users to generate a second set of candidate-users using edge-features. The method includes filtering, using a second-stage filtering model, the second set of candidate-users to generate a third-set of candidate-users using the edge-features and user-features. The method includes ranking, using a user-engagement model, the third set of candidate-users using a feature superset based on a probability of the first user connecting with the respective candidate-user. The method includes sending, to a client system of the first user, instructions for generating a suggested-friends interface for display. The suggested-friends interface includes candidate-users from the third set of candidate-users having a ranking greater than a threshold rank.

17 Claims, 7 Drawing Sheets

(56) References Cited

U.S. PATENT DOCUMENTS

| | | |
|---|---|---|
| 8,060,639 B2 | 11/2011 | Smit |
| 8,082,278 B2 | 12/2011 | Agrawal |
| 8,112,529 B2 | 2/2012 | Van Den Oord |
| 8,135,721 B2 | 3/2012 | Joshi |
| 8,145,636 B1 | 3/2012 | Jeh |
| 8,180,804 B1 | 5/2012 | Narayanan |
| 8,185,558 B1 | 5/2012 | Narayanan |
| 8,209,330 B1 | 6/2012 | Covell |
| 8,239,364 B2 | 8/2012 | Wable |
| 8,244,848 B1 | 8/2012 | Narayanan |
| 8,271,471 B1 | 9/2012 | Kamvar |
| 8,271,546 B2 | 9/2012 | Gibbs |
| 8,301,639 B1 | 10/2012 | Myllymaki |
| 8,306,922 B1 | 11/2012 | Kunal |
| 8,312,056 B1 | 11/2012 | Peng |
| 8,321,364 B1 | 11/2012 | Gharpure |
| 8,364,709 B1 | 1/2013 | Das |
| 8,386,465 B2 | 2/2013 | Ansari |
| 8,407,200 B2 | 3/2013 | Wable |
| 8,412,749 B2 | 4/2013 | Fortuna |
| 8,538,960 B2 | 9/2013 | Wong |
| 8,572,129 B1 | 10/2013 | Lee |
| 8,578,274 B2 | 11/2013 | Druzgalski |
| 8,595,297 B2 | 11/2013 | Marcucci |
| 8,601,027 B2 | 12/2013 | Behforooz |
| 8,606,721 B1 | 12/2013 | Dicker |
| 8,639,725 B1 | 1/2014 | Udeshi |
| 8,732,208 B2 | 5/2014 | Lee |
| 8,751,521 B2 | 6/2014 | Lee |
| 8,775,324 B2 | 7/2014 | Zhu |
| 8,782,080 B2 | 7/2014 | Lee |
| 8,782,753 B2 | 7/2014 | Lunt |
| 8,832,111 B2 | 9/2014 | Venkataramani |
| 8,868,590 B1 | 10/2014 | Donneau-Golencer |
| 8,868,603 B2 | 10/2014 | Lee |
| 8,898,226 B2 | 11/2014 | Tiu |
| 8,909,637 B2 | 12/2014 | Patterson |
| 8,914,392 B2 | 12/2014 | Lunt |
| 8,918,418 B2 | 12/2014 | Lee |
| 8,924,406 B2 | 12/2014 | Lunt |
| 8,935,255 B2 | 1/2015 | Sankar |
| 8,935,261 B2 | 1/2015 | Pipegrass |
| 8,935,271 B2 | 1/2015 | Lassen |
| 8,949,232 B2 | 2/2015 | Harrington |
| 8,949,250 B1 | 2/2015 | Garg |
| 8,949,261 B2 | 2/2015 | Lunt |
| 8,954,675 B2 | 2/2015 | Venkataramani |
| 8,983,991 B2 | 3/2015 | Sankar |
| 9,781,218 B2 * | 10/2017 | Lessin .................. H04L 67/22 |
| 2002/0059199 A1 | 5/2002 | Harvey |
| 2002/0086676 A1 | 7/2002 | Hendrey |
| 2002/0196273 A1 | 12/2002 | Krause |
| 2003/0154194 A1 | 8/2003 | Jonas |
| 2003/0208474 A1 | 11/2003 | Soulanille |
| 2004/0088325 A1 | 5/2004 | Elder |
| 2004/0172237 A1 | 9/2004 | Saldanha |
| 2004/0215793 A1 | 10/2004 | Ryan |
| 2004/0243568 A1 | 12/2004 | Wang |
| 2004/0255237 A1 | 12/2004 | Tong |
| 2005/0091202 A1 | 4/2005 | Thomas |
| 2005/0125408 A1 | 6/2005 | Somaroo |
| 2005/0131872 A1 | 6/2005 | Calbucci |
| 2005/0171955 A1 | 8/2005 | Hull |
| 2005/0256756 A1 | 11/2005 | Lam |
| 2006/0041597 A1 | 2/2006 | Conrad |
| 2006/0117378 A1 | 6/2006 | Tam |
| 2006/0136419 A1 | 6/2006 | Brydon |
| 2006/0190436 A1 | 8/2006 | Richardson |
| 2006/0218111 A1 | 9/2006 | Cohen |
| 2007/0174304 A1 | 7/2007 | Shrufi |
| 2007/0192293 A1 | 8/2007 | Swen |
| 2007/0277100 A1 | 11/2007 | Sheha |
| 2008/0005064 A1 | 1/2008 | Sarukkai |
| 2008/0033926 A1 | 2/2008 | Matthews |
| 2008/0072180 A1 | 3/2008 | Chevalier |
| 2008/0114730 A1 | 5/2008 | Larimore |
| 2008/0183694 A1 | 7/2008 | Cane |
| 2008/0183695 A1 | 7/2008 | Jadhav |
| 2008/0270615 A1 | 10/2008 | Centola |
| 2009/0006543 A1 | 1/2009 | Smit |
| 2009/0054043 A1 | 2/2009 | Hamilton |
| 2009/0094200 A1 | 4/2009 | Baeza-Yates |
| 2009/0164408 A1 | 6/2009 | Grigorik |
| 2009/0164431 A1 | 6/2009 | Zivkovic |
| 2009/0164929 A1 | 6/2009 | Chen |
| 2009/0197681 A1 | 8/2009 | Krishnamoorthy |
| 2009/0222348 A1 | 9/2009 | Ransom |
| 2009/0228296 A1 | 9/2009 | Ismalon |
| 2009/0259624 A1 | 10/2009 | DeMaris |
| 2009/0259646 A1 | 10/2009 | Fujita |
| 2009/0265326 A1 | 10/2009 | Lehrman |
| 2009/0271370 A1 | 10/2009 | Jagadish |
| 2009/0271374 A1 | 10/2009 | Korn |
| 2009/0276414 A1 | 11/2009 | Gao |
| 2009/0281988 A1 | 11/2009 | Yoo |
| 2009/0299963 A1 | 12/2009 | Pippori |
| 2010/0049802 A1 | 2/2010 | Raman |
| 2010/0057723 A1 | 3/2010 | Rajaram |
| 2010/0082695 A1 | 4/2010 | Hardt |
| 2010/0125562 A1 | 5/2010 | Nair |
| 2010/0145771 A1 | 6/2010 | Fligler |
| 2010/0179929 A1 | 7/2010 | Yin |
| 2010/0197318 A1 | 8/2010 | Petersen |
| 2010/0228744 A1 | 9/2010 | Craswell |
| 2010/0235354 A1 | 9/2010 | Gargaro |
| 2010/0250526 A1 | 9/2010 | Prochazka |
| 2010/0321399 A1 | 12/2010 | Ellren |
| 2011/0004609 A1 | 1/2011 | Chitiveli |
| 2011/0022602 A1 | 1/2011 | Luo |
| 2011/0078166 A1 | 3/2011 | Oliver |
| 2011/0087534 A1 | 4/2011 | Strebinger |
| 2011/0137902 A1 | 6/2011 | Wable |
| 2011/0184981 A1 | 7/2011 | Lu |
| 2011/0191371 A1 | 8/2011 | Elliott |
| 2011/0196855 A1 | 8/2011 | Wable |
| 2011/0231296 A1 | 9/2011 | Gross |
| 2011/0276396 A1 | 11/2011 | Rathod |
| 2011/0313992 A1 | 12/2011 | Groeneveld |
| 2011/0320470 A1 | 12/2011 | Williams |
| 2012/0042020 A1 | 2/2012 | Kolari |
| 2012/0047147 A1 | 2/2012 | Redstone |
| 2012/0059708 A1 | 3/2012 | Galas |
| 2012/0110080 A1 | 5/2012 | Panyam |
| 2012/0136852 A1 | 5/2012 | Geller |
| 2012/0166432 A1 | 6/2012 | Tseng |
| 2012/0166433 A1 | 6/2012 | Tseng |
| 2012/0179637 A1 | 7/2012 | Juan |
| 2012/0185472 A1 | 7/2012 | Ahmed |
| 2012/0185486 A1 | 7/2012 | Voigt |
| 2012/0209832 A1 | 8/2012 | Neystadt |
| 2012/0221581 A1 | 8/2012 | Narayanan |
| 2012/0271831 A1 | 10/2012 | Narayanan |
| 2012/0278127 A1 | 11/2012 | Kirakosyan |
| 2012/0284329 A1 | 11/2012 | Van Den Oord |
| 2012/0290950 A1 | 11/2012 | Rapaport |
| 2012/0310922 A1 | 12/2012 | Johnson |
| 2012/0311034 A1 | 12/2012 | Goldband |
| 2012/0317088 A1 | 12/2012 | Pantel |
| 2012/0331063 A1 | 12/2012 | Rajaram |
| 2013/0031106 A1 | 1/2013 | Schechter |
| 2013/0031113 A1 | 1/2013 | Feng |
| 2013/0041876 A1 | 2/2013 | Dow |
| 2013/0066876 A1 | 3/2013 | Raskino |
| 2013/0073400 A1 | 3/2013 | Heath |
| 2013/0085970 A1 | 4/2013 | Karnik |
| 2013/0086024 A1 | 4/2013 | Liu |
| 2013/0086057 A1 | 4/2013 | Harrington |
| 2013/0097140 A1 | 4/2013 | Scheel |
| 2013/0124538 A1 | 5/2013 | Lee |
| 2013/0124542 A1 | 5/2013 | Lee |
| 2013/0144899 A1 | 6/2013 | Lee |
| 2013/0191372 A1 | 7/2013 | Lee |
| 2013/0191416 A1 | 7/2013 | Lee |
| 2013/0198219 A1 | 8/2013 | Cohen |

(56) References Cited

U.S. PATENT DOCUMENTS

| | | |
|---|---|---|
| 2013/0204737 A1 | 8/2013 | Agarwal |
| 2013/0226918 A1 | 8/2013 | Berkhim |
| 2013/0227011 A1 | 8/2013 | Sharma |
| 2013/0246404 A1 | 9/2013 | Annau |
| 2013/0254155 A1 | 9/2013 | Thollot |
| 2013/0254305 A1 | 9/2013 | Cheng |
| 2014/0006416 A1 | 1/2014 | Leslie |
| 2014/0067535 A1 | 3/2014 | Rezaei |
| 2014/0122465 A1 | 5/2014 | Bilinski |
| 2014/0280080 A1 | 9/2014 | Solheim |
| 2014/0304429 A1 | 10/2014 | Softky |
| 2015/0074020 A1* | 3/2015 | Arpat .................. G06N 99/005 706/12 |
| 2015/0074289 A1 | 3/2015 | Hyman |
| 2015/0161519 A1 | 6/2015 | Zhong |
| 2015/0286643 A1 | 10/2015 | Kumar |
| 2015/0363402 A1 | 12/2015 | Jackson |
| 2016/0026727 A1 | 1/2016 | Bar-Yossef |
| 2016/0041982 A1 | 2/2016 | He |
| 2016/0042067 A1 | 2/2016 | Weng |
| 2016/0063093 A1 | 3/2016 | Boucher |
| 2016/0063115 A1 | 3/2016 | Ayan |
| 2016/0162502 A1 | 6/2016 | Zhou |
| 2016/0203238 A1 | 7/2016 | Cherniavskii |
| 2016/0259790 A1* | 9/2016 | Mashiach ........... G06F 17/3053 |
| 2017/0147696 A1* | 5/2017 | Evnine .............. G06F 17/30867 |
| 2017/0308583 A1* | 10/2017 | Husain .............. G06F 17/30528 |
| 2018/0181662 A1* | 6/2018 | Mashiach ......... G06F 17/30867 |

* cited by examiner

FIG. 4

MULTI-STAGE FILTERING FOR RECOMMENDED USER CONNECTIONS ON ONLINE SOCIAL NETWORKS

TECHNICAL FIELD

This disclosure generally relates to online social networks and recommending user connections within a social-networking environment.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

SUMMARY OF PARTICULAR EMBODIMENTS

In particular embodiments, a social-networking system may recommend user connections to a first user of the online social network in order to encourage the first user to further interact with the online social network and other users. These recommended user connections may be selected from a group of users having similar interests or friends in common with the first user. Because an online social network allows users to potentially connect with a larger number of people than possible just in person, the number of candidate-users can be large. For example, if an average online social network user has three hundred friends, using a pool of candidate-users consisting of second-degree connections (friends-of-friends), the number of candidate-users could be up to ninety thousand. Expanding the pool of candidate-users to third-degree connection could increase the number of candidate-users to 27 million. If the social-networking system attempted to evaluate the entire pool of candidate-users using typical methods for all users of an online social network the analysis may be technically challenging, require vast computing resources or, if using a less comprehensive evaluation, risk being too shallow and miss potential high-value connections. To solve this technical problem, the social-networking system may filter candidate-users in stages to remove candidate-users with whom the first user is unlikely to successfully connect from the pool without removing high-potential candidate-users. Filtering the large pool of candidate-users in stages using different features as filter criteria may improve the speed of the analysis and reduce the amount of computing resources required without sacrificing quality. The result may be more candidate-users already known by the first user outside of the online social network, or candidate-users with whom the first user is more likely to connect.

In particular embodiments, the social-networking system may generate connection recommendations for a first user of an online social network using a first-stage filtering model and a second-stage filtering model in combination with a user-engagement model. The social-networking system may present to a first user a suggested-friends interface (e.g., in a "People You May Know" type interface) by analyzing a set of users within a threshold degree of separation of the first user by determining which ones are most likely to be known by the user. The system may also determine the most likely users with whom the first user will successfully connect. As an example, a first user may request a "People You May Know" list while seeking new connections. The social-networking system may provide to the first user an interface including this list. The social-networking system may generate the interface beginning with a pool of candidate-users based on users who are second-degree connections (i.e., friends of the first user's current friends, but are not yet friends of the first user). The pool of candidate-users may be reduced based on information about the candidate-user or the candidate-user's connections. In particular embodiments, the social-networking system may insert a "People You May Know" module into the newsfeed of a first user while the user is browsing the online social network. The candidate-users may be presented to the first user because of connections in common to other kinds of entities, such as a similar hometown or a common employer. Inserting a "People You May Know" module in such a manner may encourage the first user on the online social network to grow their social network with minimal effort on the part of the user.

In particular embodiments the social-networking system may identify candidate-users by selecting from a social graph user nodes within a threshold degree of separation of a user node representing the first user. The first-stage filtering model may filter the candidate-users based on one or more edge-features describing the connections between a given pair of users. The second-stage filtering model may filter the candidate-users based on the one or more edge-features and one or more user-features. The one or more user-features may include demographic information, interaction history information, or a comparison of information between two particular users. The user-engagement model may rank candidate-users based on a calculated probability that the first user will connect with each candidate-user based on the one or more edge-features, the one or more user-features, or additional information. The social-networking system may send instructions to the client system of the first user for generating a suggested-friends interface including candidate-users exceeding a threshold rank to the first user.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 4 illustrates an example embedded suggested-friends interface.

DESCRIPTION OF EXAMPLE EMBODIMENTS

System Overview

Figure 1:
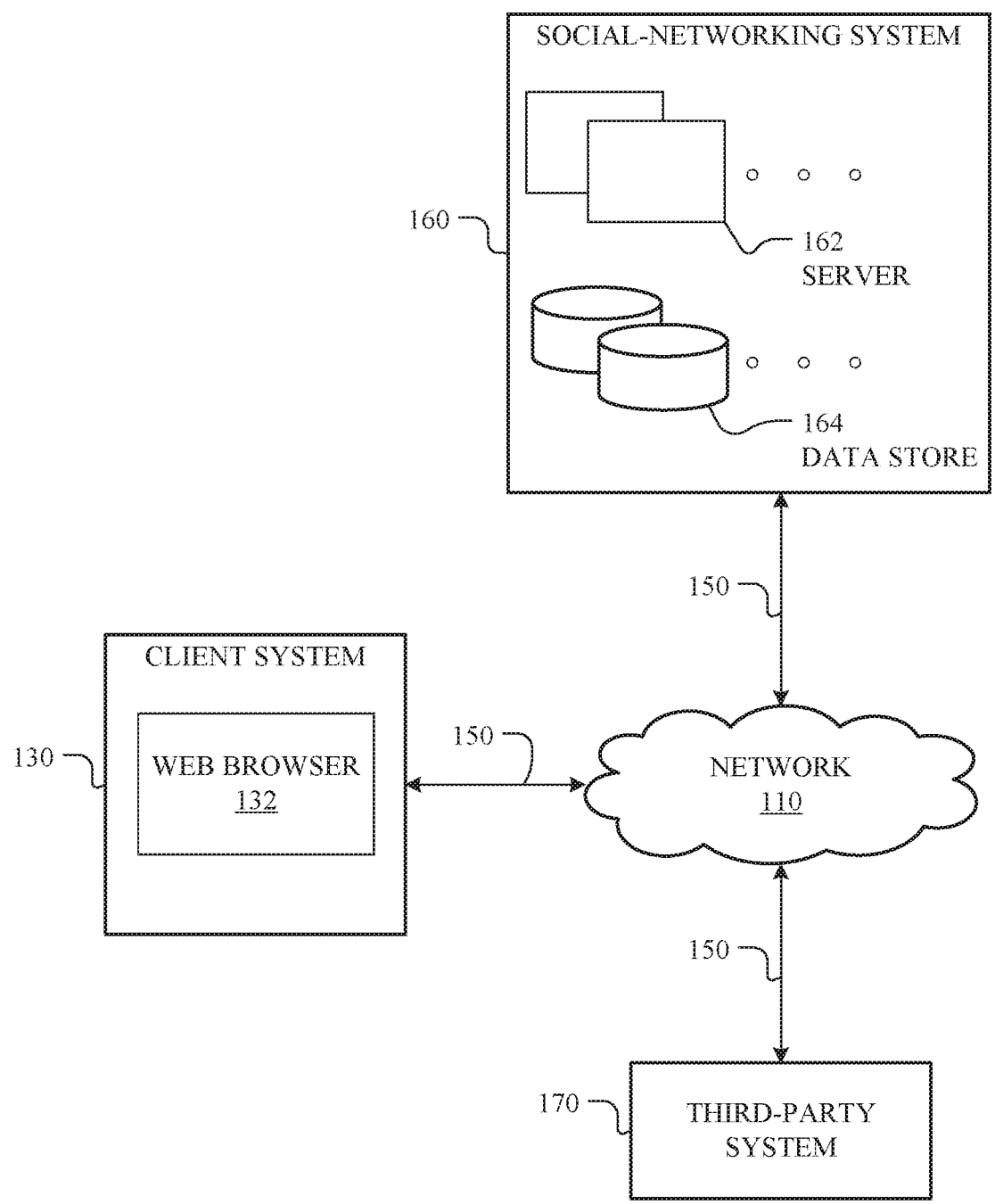
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of a client system 130, a social-networking system 160, a third-party system 170, and a network 110, this disclosure contemplates any suitable arrangement of a client system 130, a social-networking system 160, a third-party system 170, and a network 110. As an example and not by way of limitation, two or more of a client system 130, a social-networking system 160, and a third-party system 170 may be connected to each other directly, bypassing a network 110. As another example, two or more of a client system 130, a social-networking system 160, and a third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client systems 130, social-networking systems 160, third-party systems 170, and networks 110.

This disclosure contemplates any suitable network 110. As an example and not by way of limitation, one or more portions of a network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 110 may include one or more networks 110.

Links 150 may connect a client system 130, a social-networking system 160, and a third-party system 170 to a communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout a network environment 100. One or more first links 150 may differ in one or more respects from one or more second links 150.

In particular embodiments, a client system 130 may be an electronic device including hardware, software, or embedded logic components or a combination of two or more such components and capable of carrying out the appropriate functionalities implemented or supported by a client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at a client system 130 to access a network 110. A client system 130 may enable its user to communicate with other users at other client systems 130.

In particular embodiments, a client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at a client system 130 may enter a Uniform Resource Locator (URL) or other address directing a web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to a client system 130 one or more Hyper Text Markup Language (HTML) files responsive to the HTTP request. The client system 130 may render a web interface (e.g. a webpage) based on the HTML files from the server for presentation to the user. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web interface encompasses one or more corresponding source files (which a browser may use to render the web interface) and vice versa, where appropriate.

In particular embodiments, the social-networking system 160 may be a network-addressable computing system that can host an online social network. The social-networking system 160 may generate, store, receive, and send social-networking data, such as, for example, user-profile data, concept-profile data, social-graph information, or other suitable data related to the online social network. The social-networking system 160 may be accessed by the other components of network environment 100 either directly or via a network 110. As an example and not by way of limitation, a client system 130 may access the social-networking system 160 using a web browser 132, or a native application associated with the social-networking system 160 (e.g., a mobile social-networking application, a messaging application, another suitable application, or any combination thereof) either directly or via a network 110. In particular embodiments, the social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, the social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, the social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. The social-networking system 160 may provide users of the online social network the ability to communicate and interact with other users. In particular embodiments, users may join the online social network via the social-networking system 160 and then add connections (e.g., relationships) to a number of other users of the social-networking system 160 whom they want to be connected to. Herein, the term "friend" may refer to any other user of the social-networking system 160 with whom a user has formed a connection, association, or relationship via the social-networking system 160.

In particular embodiments, the social-networking system 160 may provide users with the ability to take actions on various types of items or objects, supported by the social-networking system 160. As an example and not by way of limitation, the items and objects may include groups or social networks to which users of the social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 160 or by an external system of a third-party system 170, which is separate from the social-networking system 160 and coupled to the social-networking system 160 via a network 110.

In particular embodiments, the social-networking system 160 may be capable of linking a variety of entities. As an example and not by way of limitation, the social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating the social-networking system 160. In particular embodiments, however, the social-networking system 160 and third-party systems 170 may operate in conjunction with each other to provide social-networking services to users of the social-networking system 160 or third-party systems 170. In this sense, the social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 160 also includes user-generated content objects, which may enhance a user's interactions with the social-networking system 160. User-generated content may include anything a user can add, upload, send, or "post" to the social-networking system 160. As an example and not by way of limitation, a user communicates posts to the social-networking system 160 from a client system 130. Posts may include data such as status updates or other textual data, location information, photos, videos, links, music or other similar data or media. Content may also be added to the social-networking system 160 by a third-party through a "communication channel," such as a newsfeed or stream.

In particular embodiments, the social-networking system 160 may include a variety of servers, sub-systems, programs, modules, logs, and data stores. In particular embodiments, the social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 160 may also include suitable components such as network interfaces, security mechanisms, load balancers, failover servers, management-and-network-operations consoles, other suitable components, or any suitable combination thereof. In particular embodiments, the social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 160 to one or more client systems 130 or one or more third-party systems 170 via a network 110. The web server may include a mail server or other messaging functionality for receiving and routing messages between the social-networking system 160 and one or more client systems 130. An API-request server may allow a third-party system 170 to access information from the social-networking system 160 by calling one or more APIs. An action logger may be used to receive communications from a web server about a user's actions on or off the social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from a client system 130 responsive to a request received from a client system 130. Authorization servers may be used to enforce one or more privacy settings of the users of the social-networking system 160. A privacy setting of a user determines how particular information associated with a user can be shared. The authorization server may allow users to opt in to or opt out of having their actions logged by the social-networking system 160 or shared with other systems (e.g., a third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Social Graphs

Figure 2:
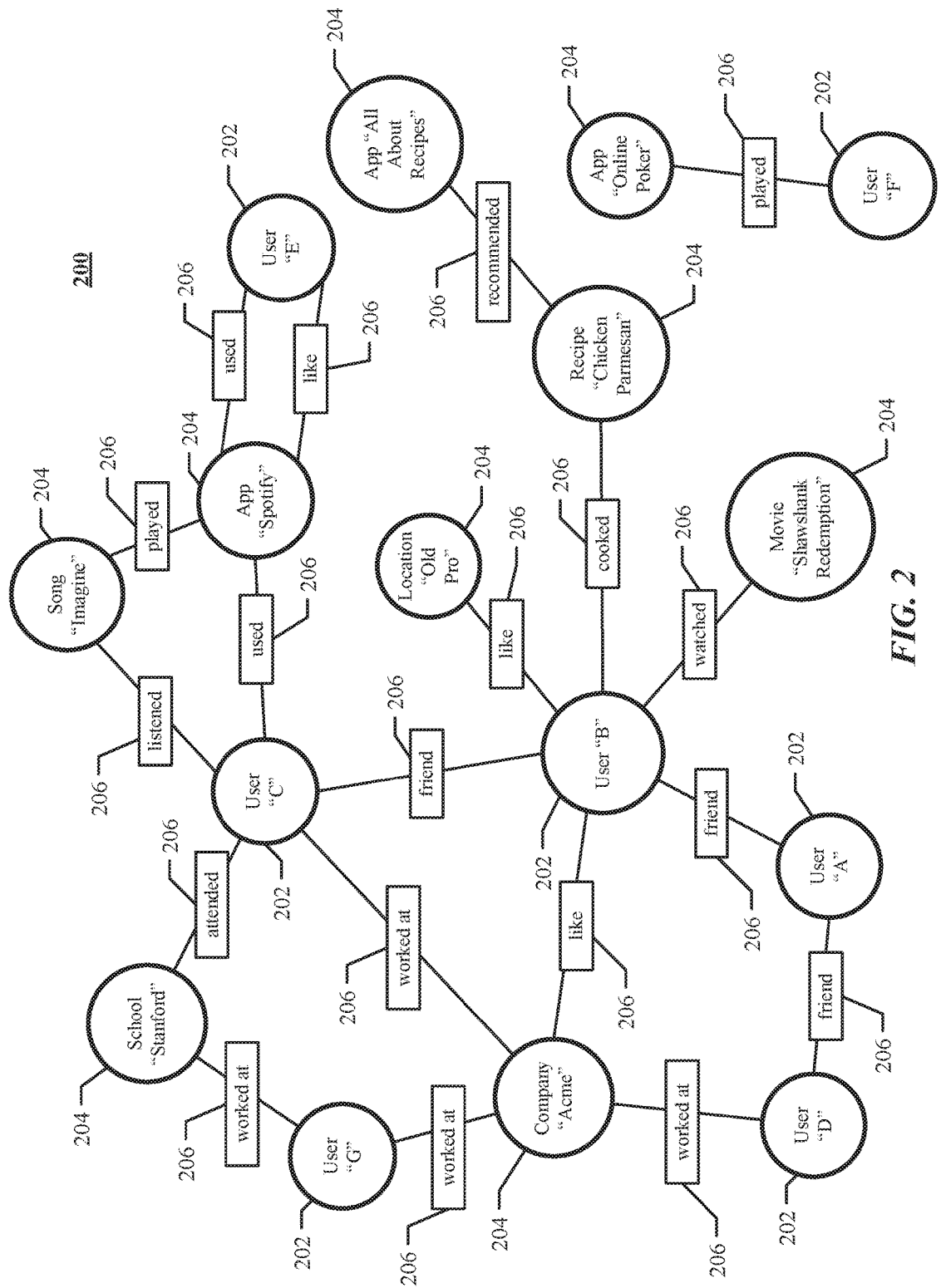
FIG. 2 illustrates an example social graph.

FIG. 2 illustrates an example social graph 200. In particular embodiments, the social-networking system 160 may store one or more social graphs 200 in one or more data stores. In particular embodiments, the social graph 200 may include multiple nodes—which may include multiple user nodes 202 or multiple concept nodes 204—and multiple edges 206 connecting the nodes. The example social graph 200 illustrated in FIG. 2 is shown, for didactic purposes, in a two-dimensional visual map representation. In particular embodiments, a social-networking system 160, a client system 130, or a third-party system 170 may access the social graph 200 and related social-graph information for suitable applications. The nodes and edges of the social graph 200 may be stored as data objects, for example, in a data store (such as a social-graph database). Such a data store may include one or more searchable or queryable indexes of nodes or edges of the social graph 200.

In particular embodiments, a user node 202 may correspond to a user of the social-networking system 160. As an example and not by way of limitation, a user may be an individual (human user), an entity (e.g., an enterprise, business, or third-party application), or a group (e.g., of individuals or entities) that interacts or communicates with or over the social-networking system 160. In particular embodiments, when a user registers for an account with the social-networking system 160, the social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with the social-networking system 160. In particular embodiments, a user node 202 may be associated with information provided by a user or information gathered by various systems, including the social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more web interfaces.

In particular embodiments, a concept node 204 may correspond to a concept. As an example and not by way of limitation, a concept may correspond to a place (such as, for example, a movie theater, restaurant, landmark, or city); a website (such as, for example, a website associated with the social-networking system 160 or a third-party website associated with a web-application server); an entity (such as, for example, a person, business, group, sports team, or celebrity); a resource (such as, for example, an audio file, video file, digital photo, text file, structured document, or application) which may be located within the social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including the social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more web interfaces.

In particular embodiments, a node in the social graph 200 may represent or be represented by a web interface (which may be referred to as a "profile interface"). Profile interfaces may be hosted by or accessible to the social-networking system 160. Profile interfaces may also be hosted on third-party websites associated with a third-party system 170. As an example and not by way of limitation, a profile interface corresponding to a particular external web interface may be the particular external web interface and the profile interface may correspond to a particular concept node 204. Profile interfaces may be viewable by all or a selected subset of other users. As an example and not by way of limitation, a user node 202 may have a corresponding user-profile interface in which the corresponding user may add content, make declarations, or otherwise express himself or herself. As another example and not by way of limitation, a concept node 204 may have a corresponding concept-profile interface in which one or more users may add content, make declarations, or express themselves, particularly in relation to the concept corresponding to concept node 204.

In particular embodiments, a concept node 204 may represent a third-party web interface or resource hosted by a third-party system 170. The third-party web interface or resource may include, among other elements, content, a selectable or other icon, or other inter-actable object (which may be implemented, for example, in JavaScript, AJAX, or PHP codes) representing an action or activity. As an example and not by way of limitation, a third-party web interface may include a selectable icon such as "like," "check-in," "eat," "recommend," or another suitable action or activity. A user viewing the third-party web interface may perform an action by selecting one of the icons (e.g., "check-in"), causing a client system 130 to send to the social-networking system 160 a message indicating the user's action. In response to the message, the social-networking system 160 may create an edge (e.g., a check-in-type edge) between a user node 202 corresponding to the user and a concept node 204 corresponding to the third-party web interface or resource and store edge 206 in one or more data stores.

In particular embodiments, a pair of nodes in the social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, the social-networking system 160 may send a "friend request" to the second user. If the second user confirms the "friend request," the social-networking system 160 may create an edge 206 connecting the first user's user node 202 to the second user's user node 202 in the social graph 200 and store edge 206 as social-graph information in one or more of data stores 164. In the example of FIG. 2, the social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in the social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to an edge type or subtype. A concept-profile interface corresponding to a concept node 204 may include, for example, a selectable "check in" icon (such as, for example, a clickable "check in" icon) or a selectable "add to favorites" icon. Similarly, after a user clicks these icons, the social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, the social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, the social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, the social-networking system 160 may create an edge 206 between a user node 202 and a concept node 204 in the social graph 200. As an example and not by way of limitation, a user viewing a concept-profile interface (such as, for example, by using a web browser or a special-purpose application hosted by the user's client system 130) may indicate that he or she likes the concept represented by the concept node 204 by clicking or selecting a "Like" icon, which may cause the user's client system 130 to send to the social-networking system 160 a message indicating the user's liking of the concept associated with the concept-profile interface. In response to the message, the social-networking system 160 may create an edge 206 between user node 202 associated with the user and concept node 204, as illustrated by "like" edge 206 between the user and concept node 204. In particular embodiments, the social-networking system 160 may store an edge 206 in one or more data stores. In particular embodiments, an edge 206 may be automatically formed by the social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Multi-Stage Filtering for Recommended User Connections

In particular embodiments, a social-networking system may recommend user connections to a first user of the online social network in order to encourage the first user to further interact with the online social network and other users. These recommended user connections may be selected from a group of users having similar interests or friends in common with the first user. Because an online social network allows users to potentially connect with a larger number of people than possible just in person, the number of candidate-users can be large. For example, if an average online social network user has three hundred friends, using a pool of candidate-users consisting of second-degree connections (friends-of-friends), the number of candidate-users could be up to ninety thousand. Expanding the pool of candidate-users to third-degree connection could increase the number of candidate-users to 27 million. If the social-networking system attempted to evaluate the entire pool of candidate-users using typical methods for all users of an online social network the analysis may be technically challenging, require vast computing resources or, if using a less comprehensive evaluation, risk being too shallow and miss potential high-likelihood connections. To solve this technical problem, the social-networking system may filter candidate-users in stages to remove candidate-users with whom the first user is unlikely to successfully connect from the pool without removing high-potential candidate-users. Filtering the large pool of candidate-users in stages using different features as filter criteria may improve the speed of the analysis and reduce the amount of computing resources required without sacrificing quality. The result may be more candidate-users already known by the first user outside of the online social network, or candidate-users with whom the first user is more likely to connect.

In particular embodiments, the social-networking system may generate connection recommendations for a first user of an online social network using a first-stage filtering model and a second-stage filtering model in combination with a user-engagement model. The social-networking system may present to a first user a suggested-friends interface (e.g., in a "People You May Know" type interface) by analyzing a set of users within a threshold degree of separation of the first user by determining which ones are most likely to be known by the user. The system may also determine the most likely users with whom the first user will successfully connect. As an example, a first user may request a "People You May Know" list while seeking new connections on the online social network. The social-networking system may provide to the first user an interface including this list. The social-networking system may generate the interface beginning with a pool of candidate-users based on users who are second-degree connections (i.e., friends of the first user's current friends, but are not yet friends of the first user). The pool of candidate-users may be reduced based on information about the candidate-user or the candidate-user's connections. In particular embodiments, the social-networking system may insert a "People You May Know" module into the newsfeed of a first user while the user is browsing the online social network. The candidate-users may be presented to the first user because of connections in common to other kinds of entities, such as a similar hometown or a common employer. Inserting a "People You May Know" module in such a manner may encourage the first user on the online social network to grow their social network with minimal effort on the part of the user.

In particular embodiments the social-networking system may identify candidate-users by selecting from a social graph user nodes within a threshold degree of separation of a user node representing the first user. The first-stage filtering model may filter the candidate-users based on one or more edge-features describing the connections between a given pair of users. The second-stage filtering model may filter the candidate-users based on the one or more edge-features and one or more user-features. The one or more user-features may include demographic information, interaction history information, or a comparison of information between two particular users. The user-engagement model may rank candidate-users based on a calculated probability that the first user will connect with each candidate-user based on the one or more edge-features, the one or more user-features, or additional information. The social-networking system may send instructions to the client system of the first user for generating a suggested-friends interface including candidate-users exceeding a threshold rank to the first user.

In particular embodiments, the social-networking system 160 may identify, for the first user, a first set of candidate-users from a plurality of second users. Each candidate-user may correspond to a second user within a threshold degree of separation of the first user within the social graph 200. In the example of FIG. 2, nodes on the social graph 200 are connected by edges 206 representing a connection between the nodes. A user node 202 may be connected to other user nodes 202 via a friend-type edge 206. If an edge 206 exists between two user nodes 202, they may be said to be directly connected (i.e., a first-degree connection). If a first user node 202 is only connected to a second-user node through one or more intervening nodes, the first and second user nodes 202 may be said to be indirectly connected (i.e., a second-degree or greater connection). An intervening node may be a user node 202 or a concept node 204. A user node 202 may be connected with a concept node 204 through a variety of edge types. As an example and not by way of limitation, as illustrated in FIG. 2, a user may "like," "attended," "played," "listened," "cooked," "worked at," or "watched" a concept, each of which may correspond to an edge type or subtype. If a first user node 202 is indirectly connected to a second user node 202 only through respective friend-type edges 206 with a single intervening user node 202, this may be called a friend-of-friend connection (i.e., second-degree connection). The social-networking system 160 may identify all users having a friend-of-friend connection to the first user. In particular embodiments, the social-networking system 160 may set the threshold degree of separation to two and identify only candidate-users corresponding to a second node 202 connected by a friend-type edge 206 to an intervening node that is connected by a friend-type edge 206 to the first node 202. The identified candidate-users may be grouped into the first set of candidate-users. As an example and not by way of limitation, in the social graph 200, users are represented by user nodes 202. For the user node 202 of user "A", the social-networking system 160 may identify user "C" as a candidate-user because the user node 202 of user "C" is connected to the user node 202 of user "B" via a friend-type edge 204 and the user node 202 of user "B" is connected to the user node 202 of user "A" via a friend-type edge 204. No friend-type edge 204 exists between the user nodes 202 of user "A" and user "C." User "C" therefore has a friend-of-friend connection to user "A." In particular embodiments, the social-networking system 160 may consider higher degrees of separation. As an example and not by way of limitation, the social-networking system 160 may identify candidate-users with a higher degree of separation for a first user with a low number of existing friend connections. A user may have a low number of friend connections because the user is new to the online social network. The social-networking system 160 may facilitate growing a user's network by increasing the threshold degree of separation to show more candidate-users. Although this disclosure describes identifying candidate-users in a particular manner, this disclosure contemplates identifying candidate-users in any suitable manner.

In particular embodiments, the social graph 200 may contain one or more edges 206 representing an inferred connection (i.e., an "inferred edge"). Each inferred connection may be derived based on one or more of: contact information imported from an external system associated with one or more users of the online social network; communication information associated with one or more users of the online social network; login information associated with one or more users of the online social network; social-graph information associated with one or more users of the online social network; other suitable information; or any combination thereof. As an example and not by way of limitation, the social-networking system 160 may create an inferred connection between a first user and a second user because the first user appears in a phone or email contact list that the second user has shared with the social-networking system 160. The social-networking system 160 may create an inferred connection between a first user and a second user because the first user has been tagged with an imported-as-contact attribute associated with the second user. As another example and not by way of limitation, the social-networking system 160 may create an inferred connection between a first user and a second user because interactions between the first user and second user using a communication service have been shared with the online social network. This may include messaging applications, mail applications, blogging services, games, music streaming services, or any other suitable communication or interaction service. As another example and not by way of limitation, the social-networking system 160 may create an inferred connection between a first user and a second user because login and device identification information shared with the online social network may indicate a device shared between two users. Login and device information may include username, telephone number, email address, IP address or MAC address of the user device or networking equipment, or any other suitable login and device information. Two user accounts associated with the same device identification, for example two users associated with the same IP address, may indicate a shared device. A shared device may indicate a connection between users of the online social network not reflected on the social graph 200. As another example and not by way of limitation, the social-networking system 160 may create an inferred connection between a first user and a second user because of social graph information associated with the users. As described above, there may be a number of possible interactions with a concept available to a user including "like," "attended," or "worked at." These interactions may cause the social-networking system 160 to create edges 206 based on this explicit activity. If multiple users interact with the same concepts through the same or different interactions, this may indicate a similarity of interests between the users. The social-networking system 160 may create an inferred edge between two user nodes 202 based on explicit activity indicating this similarity of interests. For example, in the social graph 200, the user node 202 of user "C" is connected to the concept node 204 of app "SPOTIFY" through a used-type edge 206. The user node 202 of user "E" is connected to the concept node 204 of app "SPOTIFY" through a used-type edge 206 and a like-type edge 206. The social-networking system 160 may create an inferred edge between user nodes 202 of user "C" 202 and user "E" 202 representing this similarity of interests. Although this disclosure describes creating inferred connections in a particular manner, this disclosure contemplates creating inferred connections in any suitable manner.

In particular embodiments, the social-networking system 160 may filter, using a first-stage filtering model, the first set of candidate-users to generate a second set of candidate-users. The first-stage filtering model may filter the candidate-users based on one or more features associated with the relationships between users, or "edge-features". Thus, the first-stage filtering model may be considered an edge-based filter. The first-stage filtering model may be an algorithm that generates a score and ranks the candidate-users based on that score. Filtering may be accomplished by removing candidate-users below a threshold rank. As an example and not by way of limitation, the score for a given candidate-user may be generated given edge-features e with accompanying weights w by the equation:

$$\sum_i w_i \cdot e_i$$

The social-networking system 160 may input the first set of candidate-users and a set of edge-features to a first-stage filtering model and filter out candidate-users with whom there is a relatively low calculated probability the first user will connect. The first-stage filtering model may consider a large set of candidate-users and apply a relatively small set of edge-features (for example, thirty or fewer features), to reduce the set of candidate-users. By using a small set of features at this stage, the social-networking system 160 may improve the speed of the analysis and reduce the amount of computing resources required to analyze a relatively large initial set of candidate-users. In general, edge-features may describe the closeness between people, such as the closeness between a user corresponding to an intervening node and a candidate-user. In particular embodiments, the one or more edge-features may comprise information associated with a particular pair of users. The information may comprise one or more of: an age of one or more edges connecting nodes corresponding to each user in the pair of users; a social-graph affinity of each user in the pair of users with respect to the other user; a level of engagement of each user in the pair of users with respect to the other user; other suitable information about connections between users; or any combination thereof. The following examples are described with respect to particular edge-features describing the relationship between a particular pair of users. This disclosure contemplates the first-stage filtering model considering any edge-features between any pair of users including the first user, a candidate-users, or a user corresponding to an intervening node. In particular embodiments, the pair of users may include the first user and a candidate-user. As an example and not by way of limitation, first-stage filtering model may consider the amount of time that has passed since the creation of, or "age" of, an edge between a user and a candidate-user. If an edge is relatively old, this may indicate a decreased relative likelihood of the first user wishing to connect with the candidate-user. The first user and candidate-user may each have an attended-type connection to an event. If the event occurred recently, and the attended-type connections are relatively new, the resulting inferred connection may be considered a relatively new connection. This may increase the calculated probability that the first user and candidate-user met at the event and would like to connect. This may increase the ranking of the candidate-user in the first-stage filtering model, causing the candidate-user to not be filtered out. In particular embodiments, the pair of users may include the first user and a user corresponding to an intervening node. As an example and not by way of limitation, the first-stage filtering model may consider a social-graph affinity between the first user and a user corresponding to an intervening node. The social-graph affinity may be quantitatively measured using an affinity coefficient. A low affinity coefficient may, for example, be the result of the user and user corresponding to an intervening node having recently ended a relationship. The first user may not wish to connect to any friends of their former partner and therefore the user may not wish to connect with friends of the user corresponding to an intervening node. The resulting low affinity coefficient may lower the calculated probability of a successful connection between any candidate-users associated with the user corresponding to an intervening node. The lower calculated probability may decrease the ranking of these candidate-users in the first-stage filtering model, causing them to be filtered out. In particular embodiments, the pair of users may include a user corresponding to an intervening node and a candidate-user. As an example and not by way of limitation, the first-stage filtering model may consider a strength of the relationship between users on the online social network, i.e., a "level of engagement," by analyzing the frequency and degree of the users' interactions. The first-stage filtering model may consider a level of engagement between the user corresponding to an intervening node and a candidate-user. A relatively low level of engagement between the user corresponding to an intervening node and a candidate-user may indicate a weak relationship on the online social network or a fleeting friendship. A weak relationship may lower the probability that the first user will want to connect with the candidate-user. This may decrease the ranking of the candidate-user in the first-stage filtering model, causing the candidate-user to be filtered out. Although this disclosure describes filtering the first set of candidate-users using edge-features in a particular manner, this disclosure contemplates filtering the first set of candidate-users using edge-features in any suitable manner.

In particular embodiments, the social-networking system 160 may filter, using a second-stage filtering model, the second set of candidate-users to generate a third set of candidate-users. The second-stage filtering model may filter the second set of candidate-users based on the one or more edge-features and on one or more pieces of information associated with users, or "user-features". Thus, the second-stage filtering model may be considered an edge- and user-based filter. The second-stage filtering model may be an algorithm that generates a score and ranks the candidate-users based on the score. Filtering may be accomplished by removing candidate-users below a threshold rank. As an example and not by way of limitation, the score for a given candidate-user may be generated given edge-features e with accompanying weights w, user-features u with accompanying weights v, and given interrelation weights x by the equation:

$$\sum_i w_i \cdot e_i + \sum_j v_j \cdot u_j + \sum_i \sum_j x_{ij} \cdot (e_i \cdot u_j)$$

The algorithm may combine a weighted component of the score contributed by the edge-features e, a weighted component of the score contributed by the user-features u, and a weighted component of the score contributed by the interrelationship of edge-features and user-features. Because the first-stage filtering model reduces the size of the set of candidate-users, more features may be considered by the second-stage filtering model while still reducing the amount of computing resources used when compared to considering the same number of features for the full pool of candidate-users. Using a larger number of features may result in more candidate-users with a relatively high probability of a successful connection to the first user. In particular embodiments, the one or more user-features may comprise information associated with a particular user. The information may comprise one or more of: demographic information associated with the particular user; an age of the particular user's account on the online social network; an amount of time since the particular user last accessed the online social network; a number of active chat conversations associated with the particular user, an average rate of reply to messages associated with the particular user, a number of friend requests sent by the particular user; a number of friend requests received by the particular user; a number of friend requests rejected by the particular user; a number of pending friend requests associated with the particular user; a friend request acceptance rate associated with the particular user; a friend request rejection rate associated with the particular user; an average pending time of friend requests associated with the particular user; other suitable information; or any combination thereof. User-features may include demographic information, such as age, sex, national origin, hometown, present location, level of education, employment history, or any other suitable demographic information. This demographic information may come directly from user profiles. User-features may include other information associated with a user on the online social network. This may include user activity behavior such as the rate at which a user responds to messages or friend requests, the rate at which the user engages with concepts, time since the user last logged into the online social network, other suitable user activity behavior information, or any combination thereof. As an example and not by way of limitation, the second-stage filtering model may take into account both edge-features and user-features. Consideration of an edge-feature, such as a candidate-user's engagement with a particular user, may be augmented with the additional information that the candidate-user has a relatively young account on the online social network. While a relatively low engagement alone may cause the candidate-user to be filtered out, the additional information that the candidate-user has a relatively young account may reduce the effect on the calculated probability that the first user and candidate-user will successfully connect because the candidate-user has not had time to develop stronger relationships. This may reduce any decrease in ranking, or even increase the ranking, and cause the candidate-user to not be filtered out. As another example and not by way of limitation, the second-stage filtering model may filter based on the percentage of friend requests that a candidate-user accepts. If a candidate-user has a low acceptance rate, this may increase the relative likelihood that the first user's friend request would be rejected. It may be desirable to avoid friend request rejections for the first user to avoid discouraging the first user, especially if they are new to the online social network. If the candidate-user has a low acceptance rate, the calculated probability that the first user and candidate-user will successfully connect may decrease, lowering the candidate-user's ranking causing the candidate-user to be filtered out. As another example and not by way of limitation, if a candidate-user has a low number of accepted friend requests, but also a low age of account, the candidate-user may be new to the online social network. This may mean the candidate-user has not had the time to develop an active online social network account. Taking these pieces of information together, the effect on the calculated probability of a successful connection may be reduced. This may reduce the effect on the ranking and cause the candidate-user to not be filtered out. In particular embodiments, the second-stage filtering model may filter the candidate-users based on one or more user-features by comparing information associated with the first user to information associated with each of the candidate-users in the second set of candidate-users. As an example and not by way of limitation, the second-stage filtering model may filter candidate-users based on a comparison of demographic information. If a candidate-user has the same hometown or employer as a first user it may increase the likelihood that the first user and candidate-user know each other, increasing the calculated probability that the first user will successfully connect with the candidate-user on the online social network. This may increase the ranking of the candidate-user, causing the candidate-user to not be filtered out. As another example and not by way of limitation, the second-stage filtering model may filter candidate-users based on a comparison of age with the first user. If there is a relatively large difference in age between the first user and a candidate-user the first user may not wish to connect with the candidate-user, decreasing the calculated probability of the first user and candidate-user successfully connecting. The decrease in the calculated probability may lower the rank of the candidate-user and cause the candidate-user to be filtered out. Although this disclosure describes filtering the second set of candidate-users using edge-features and user-features in a particular manner, this disclosure contemplates filtering the second set of candidate-users using edge-features and user-features in any suitable manner.

In particular embodiments, the social-networking system 160 may rank, using a user-engagement model, the third set of candidate-users based on a feature superset, wherein the user-engagement model ranks the candidate-users based on a calculated probability of the first user connecting with the respective candidate-user. After the candidate-users are filtered by the first-stage filter and second-stage filtering models, the remaining candidate-users may be input into a user-engagement model, which may use all available ranking features. The user-engagement model may be an algorithm that generates a score and ranks the candidate-users using this score. As an example and not by way of limitation, the score for a given candidate-user may be generated given edge-features e with accompanying weights w, user-features u with accompanying weights v, and given other features o with accompanying weights m, and given interrelation weights x by the equation:

$$\sum_i w_i \cdot e_i + \sum_j v_j \cdot u_j + \sum_k m_k \cdot o_k + \sum_i \sum_j \sum_k x_{ijk} \cdot (e_i \cdot u_j \cdot o_k)$$

The algorithm may combine a weighted component of the score contributed by the edge-features e, a weighted component of the score contributed by the user-features u, a weighted component of the score contributed by the other features o, and a weighted component of the score contributed by the interrelationship of edge-features, user-features, and other features. The features used by the user-engagement model may include thousands of edge-features and user-features, and may include other kinds of features. This may require heavy computation. Because of the first-stage filtering and second-stage filtering models, analysis of a large number of features may only need to be performed on a reduced number of candidate-users instead of the original large set, increasing computing efficiency. However, the full initial set of candidate-users has been considered at some point, whether by the first-stage or second-stage filtering models, which may allow for users that previously may have been excluded to conserve computing resources to be considered as candidate-users. The ranking may be determined based on: the calculated probability that the first user will initiate a connection with the particular candidate-user; the calculated probability that the candidate-user will accept the connection; a composite score using a weighted combination of the calculated probability that the first user will initiate, and the candidate-user will accept, the connection; other suitable scoring features; or any combination thereof. The weights may be based on user-features, edge-features, other suitable information, or any combination thereof. In particular embodiments, the feature superset may comprise edge-features and user-features considered during the first-stage filtering or the second-stage filtering and a plurality of additional features not considered during the first-stage filtering or the second-stage filtering. In particular embodiments, the social-networking system 160 may input the third set of candidate-users into a user-engagement model that reconsiders the edge-features and user-features used by the first-stage filtering and second-stage filtering models. The features may be considered independently or in combination with each other. As an example and not by way of limitation, the user-engagement model may use the difference in age and difference in hometown between a first user "Fred" and candidate-user "Carrie" with the social-graph affinity of Fred to the intervening user "Ivan" and the level of engagement between the Carrie and Ivan in ranking Carrie as a candidate-user for Fred. The difference in age and hometown between Fred and Carrie, when considered independently may decrease the calculated probability that Fred would successfully connect with Carrie. This may cause Carrie's ranking to be low. However, a high affinity coefficient between Fred and Ivan indicates a high social-graph affinity between the two. This, considered with a high level of engagement between Carrie and Ivan, indicative of a strong relationship, may greatly increase the calculated probability of a successful connection between Fred and Carrie because the high social-graph affinity between Fred and Ivan may be accompanied by a willingness to connect with Ivan's friends. The strong relationship between Carrie and Ivan may make her a strong candidate. Taken together, these features may result in a high ranking for Carrie. The consideration of a wide variety of features together allows for in-depth analyses of candidate-users in the third set of candidate-users. Because there is a large number of features that may be considered by the user-engagement model, there are many complex combinations available for the user-engagement model. Filtering by the first-stage and second-second filtering models allows this computationally expensive task to be performed only on candidate-users with a greater probability of a successful connection. Although this disclosure describes ranking candidate-users using a user-engagement model in a particular manner, this disclosure contemplates ranking candidate-users using a user-engagement model in any suitable manner.

Figure 3:
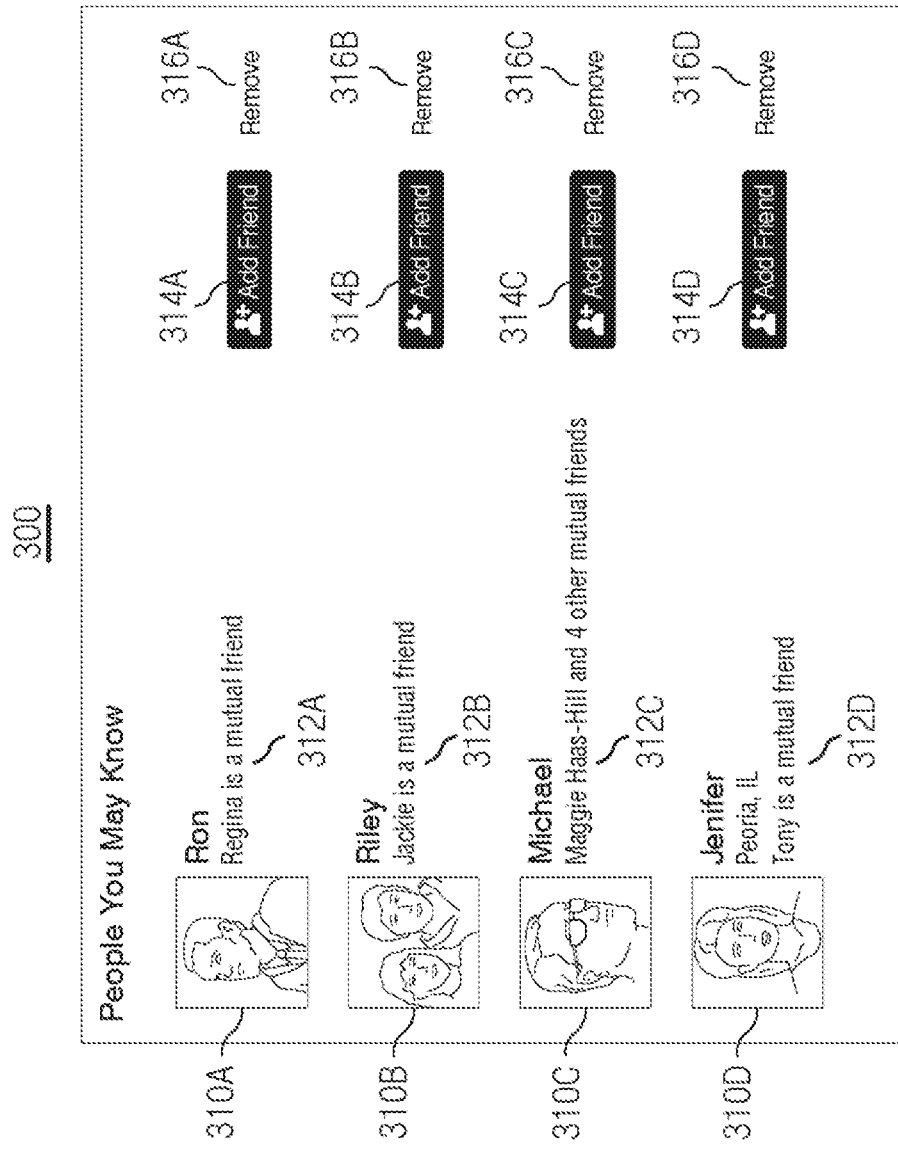
FIG. 3 illustrates an example suggested-friends interface.
Figure 4:
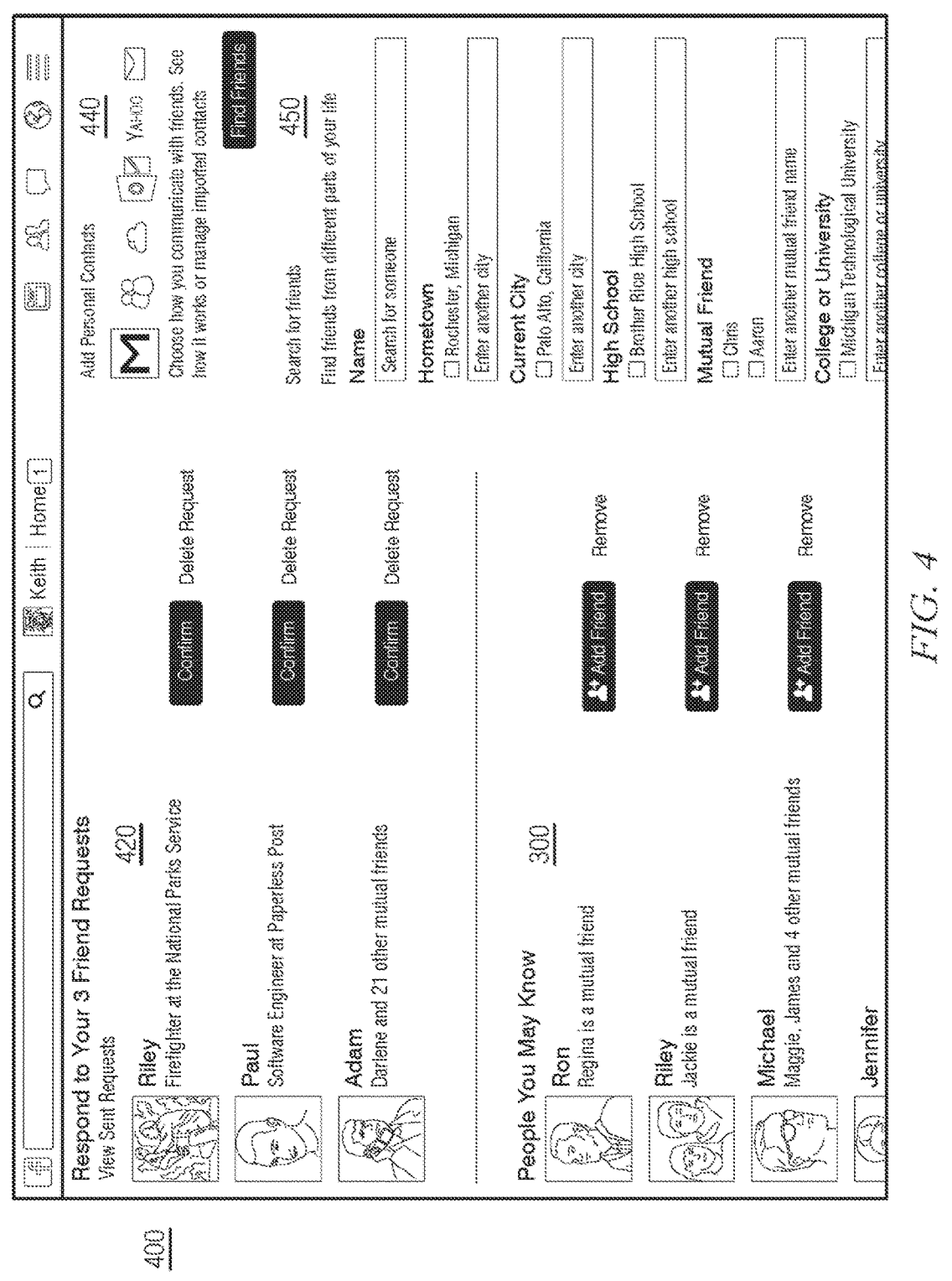
Figure 5:
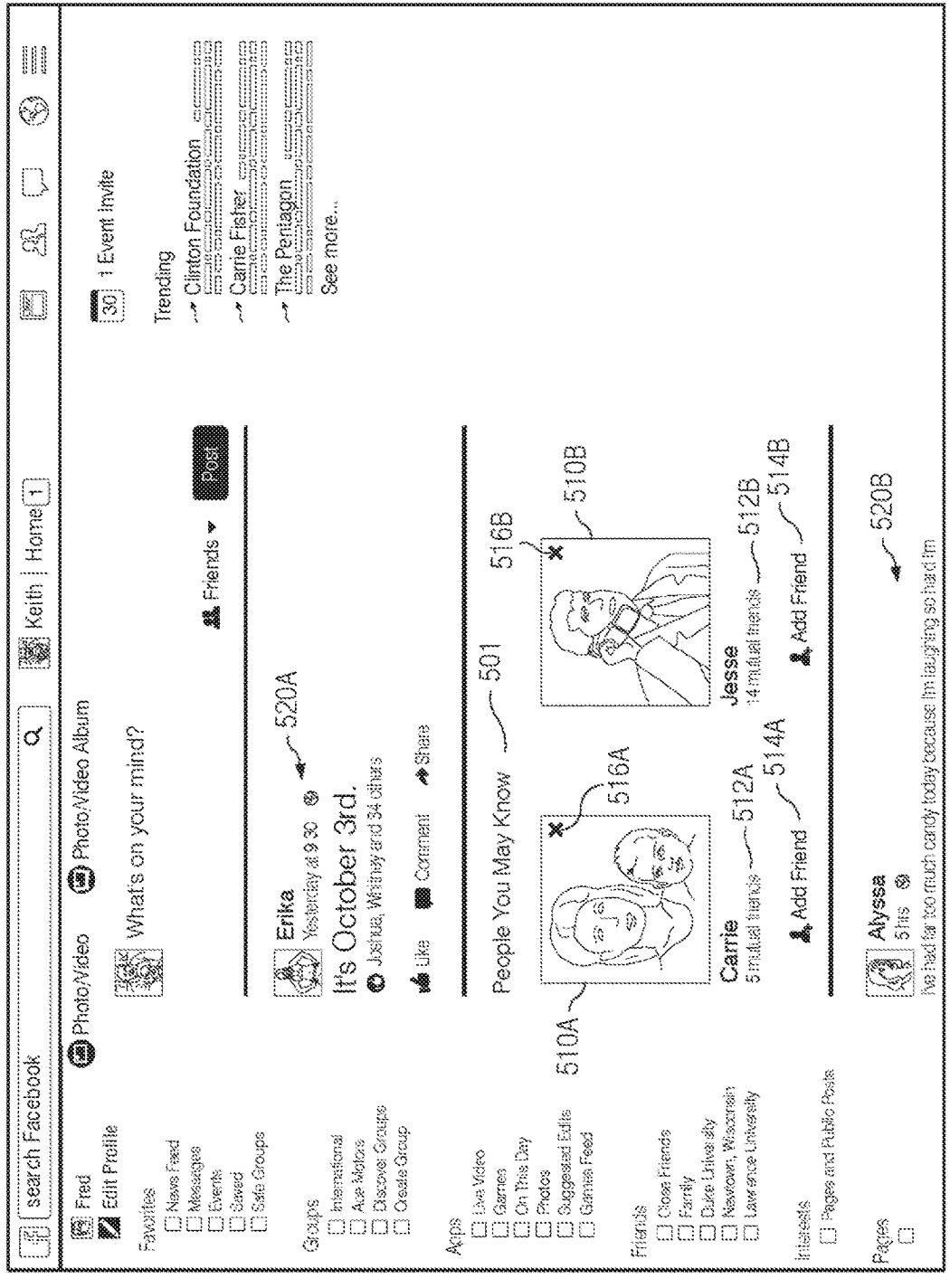
FIG. 5 illustrates another example embedded suggested-friends interface.

In particular embodiments, the social-networking system 160 may send, to a client system of the first user, instructions for generating a suggested-friends interface for display to the first user, wherein the suggested-friends interface comprises one or more candidate-users from the third set of candidate-users having a ranking greater than a threshold rank. FIG. 3 illustrates an example suggested-friends interface 300. The suggested-friends interface 300 contains a plurality of candidate-users 310A-310D as well as information 312A-312D indicating the user corresponding to the intervening node for that particular candidate-user. The suggested-friends interface 300 also has elements 314A-314D associated with each candidate-user 310A-310D that will allow the first user to connect with the candidate-user 310A-310D by sending a friend request. The suggested-friends interface 300 has other elements 316A-316D enabling the first user to dismiss a particular candidate-user 310A-310D from the suggested-friends interface 300. In particular embodiments, the instructions for generating the suggested-friends interface 300 may be sent to a native application associated with the online social network on the client system of the first user. As an example and not by way of limitation, the native application may be an application associated with the social-networking system 160 on a user's mobile client system (e.g. a smart phone, tablet, etc.). In particular embodiments, the instructions for generating the suggested-friends interface 300 may be sent to a browser client 132 on the client system 130 of the first user. In particular embodiments, the social-networking system 160 may receive a request from the first user to generate the suggested-friends interface 300 and send the instructions for generating the suggested-friends interface 300 responsive to the request. As an example and not by way of limitation, the user may request the suggested-friends interface 300 as a component of a page of the online social network dedicated to creating friend connections. FIG. 4 illustrates a suggested-friends interface 300 embedded in a page 400 of the online social network dedicated to creating friend connections. In addition to the suggested-friends interface 300 the page 400 includes a component 420 allowing the user to confirm or dismiss friend requests, a component 440 allowing the user to import a contact list or address book from other applications, and a component 450 allowing the user to search for friends using particular edge- or user-features. In particular embodiments, the instructions for generating the suggested-friends interface may be prepared in advance and sent to the user as a portion of a newsfeed page of the online social-network. FIG. 5 illustrates a newsfeed page 500 of the online social network containing an example suggested-friends interface 501. The embedded suggested-friends interface 501 contains a plurality of candidate-users 510A-510B as well as information 512A-512B indicating the user corresponding to the intervening node for that particular candidate-user. The embedded suggested-friends interface 501 also has elements 514A-514B associated with each candidate-user 510A-510B that allow the first user to initiate a connection with the candidate-user 510A-510B by sending a friend request. The suggested-friends interface 501 has other elements 516A-516B enabling the first user to dismiss a particular candidate-user 510A-510B from the suggested-friends interface 501. The embedded suggested-friends interface 501 is positioned on the newsfeed page 500 along with newsfeed posts 520A-520B. The steps of identifying, filtering, and ranking the candidate-users may be performed in the background to allow on-demand delivery of the suggested-friends interface. The identifying, filtering, and ranking steps may be performed overnight or during other off-peak usage times. The steps may be performed again if a user evaluates all candidate-users shown in the suggested-friends interface and either elects to connect with or dismiss each candidate-user. Although this disclosure describes sending instructions to generate a suggested-friends interface in a particular manner, this disclosure contemplates sending instructions to generate a suggested-friends interface in any suitable manner.

In particular embodiments, one or more of the first-stage filtering model, the second-stage filtering model, or the user-engagement model may be a machine-learning model generated based on an analysis of user interactions and connections with prior suggested candidate-users. The first-stage filtering model, second-stage filtering model, or user-engagement model may be generated by any suitable machine-learning process. As an example and not by way of limitation, a machine-learning process may include artificial neural networks and deep learning, inductive logic, support vector machines, clustering, reinforcement learning, decision trees, genetic algorithms, ensemble learning, any other suitable machine learning process; or any combination thereof. In particular embodiments the models may be trained regularly during off-peak usage times to allow the models to provide candidate-users to users in an on-demand fashion. As an example and not by way of limitation, the model may be trained using historical user interactions and success rates of prior models in making recommendations. In particular embodiments, the machine-learning model may be a gradient boosted decision tree model. Although this disclosure describes generating the first-stage filtering, second-stage filtering and user-engagement models using machine-learning techniques in a particular manner, this disclosure contemplates generating the first-stage filtering, second-stage filtering and user-engagement models in any suitable manner.

Figure 6:
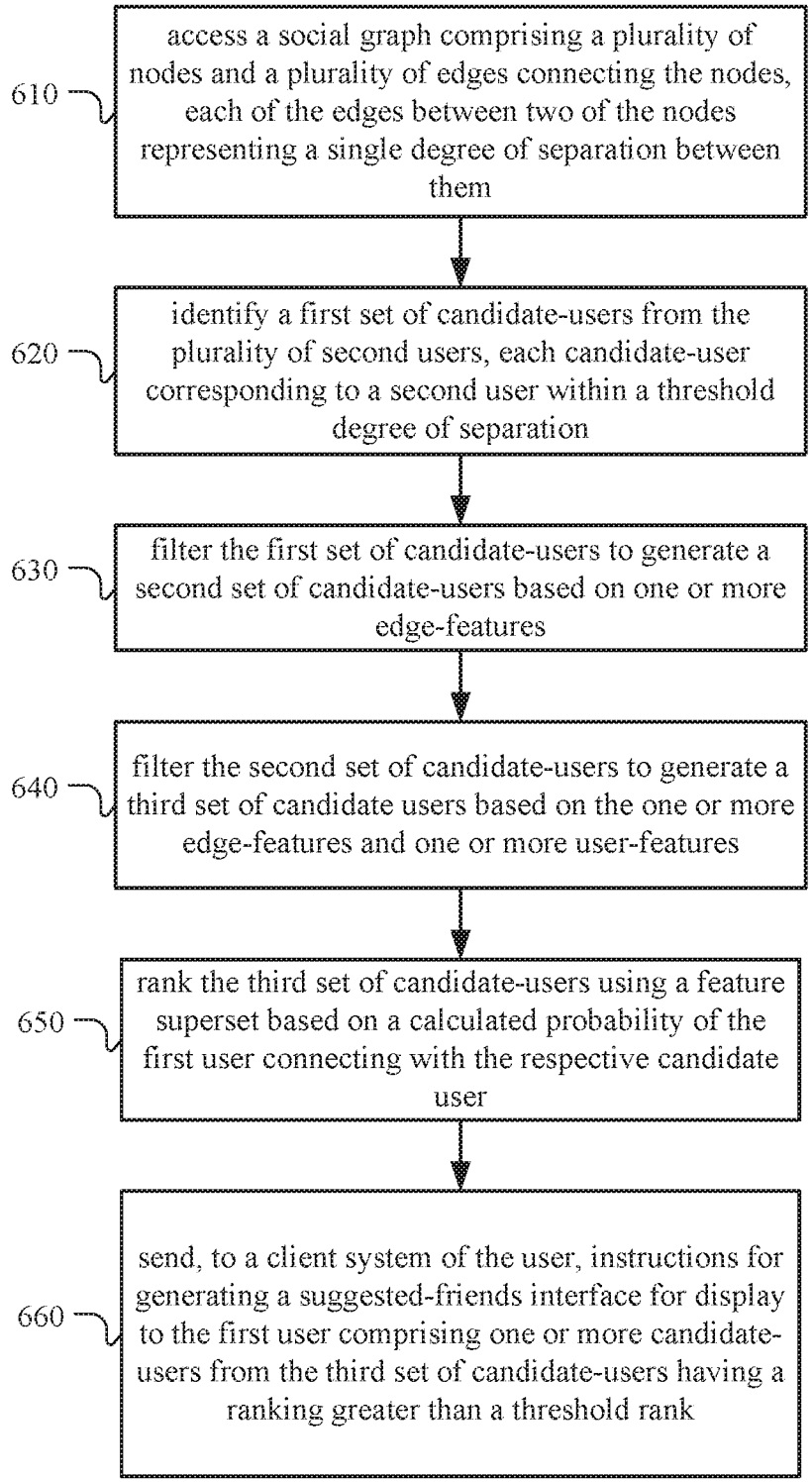
FIG. 6 illustrates an example method for generating suggested-friends recommendations.

FIG. 6 illustrates an example method 600 for generating suggested-friends recommendations for users of an online social network using first-stage filtering and second-stage filtering models in combination with a user-engagement model. The method may begin at step 610, where the social-networking system 160 may access a social graph 200 comprising a plurality of nodes and a plurality of edges 206 connecting the nodes, each of the edges 206 between two of the nodes representing a single degree of separation between them. The nodes may comprise a first node corresponding to a first user associated with an online social network, and a plurality of second nodes corresponding to a plurality of second users of the online social network, respectively. At step 620, the social-networking system 160 may identify a first set of candidate-users from the plurality of second users, each candidate-user corresponding to a second user within a threshold degree of separation. At step 630, the social-networking system 160 may filter, using a first-stage filtering model, the first set of candidate-users to generate a second set of candidate-users. The first-stage filtering model may base the filtering on one or more edge-features. At step 640, the social-networking system 160 may filter, using a second-stage filtering model, the second set of candidate-users to generate a third set of candidate-users. The second-stage filtering model may base the filtering on the one or more edge-features and on one or more user-features. At step 650, the social-networking system 160 may rank, using a user-engagement ranking model, the third set of candidate-users based on a calculated probability of the first user connecting with the respective candidate-user. At step 660, the social-networking system 160 may send to a client system 130 of the first user instructions for generating a suggested-friends interface 300 for display to the first user comprising one or more candidate-users from the third set of candidate-users having a ranking greater than a threshold rank. Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for generating suggested-friends recommendations including the particular steps of the method of FIG. 6, this disclosure contemplates any suitable method for generating suggested-friends recommendations including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Social Graph Affinity and Coefficient

In particular embodiments, the social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, the social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile interfaces, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, the social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, the social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, the social-networking system 160 may calculate a coefficient based on a user's actions. The social-networking system 160 may monitor such actions on the online social network, on a third-party system 170, on other suitable systems, or any combination thereof. Any suitable type of user actions may be tracked or monitored. Typical user actions include viewing profile interfaces, creating or posting content, interacting with content, tagging or being tagged in images, joining groups, listing and confirming attendance at events, checking-in at locations, liking particular interfaces, creating interfaces, and performing other tasks that facilitate social action. In particular embodiments, the social-networking system 160 may calculate a coefficient based on the user's actions with particular types of content. The content may be associated with the online social network, a third-party system 170, or another suitable system. The content may include users, profile interfaces, posts, news stories, headlines, instant messages, chat room conversations, emails, advertisements, pictures, video, music, other suitable objects, or any combination thereof. The social-networking system 160 may analyze a user's actions to determine whether one or more of the actions indicate an affinity for subject matter, content, other users, and so forth. As an example and not by way of limitation, if a user frequently posts content related to "coffee" or variants thereof, the social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile interface for the second user.

In particular embodiments, the social-networking system 160 may calculate a coefficient based on the type of relationship between particular objects. Referencing the social graph 200, the social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in a first photo, but merely likes a second photo, the social-networking system 160 may determine that the user has a higher coefficient with respect to the first photo than the second photo because having a tagged-in-type relationship with content may be assigned a higher weight and/or rating than having a like-type relationship with content. In particular embodiments, the social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, the social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, the social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, the social-networking system 160 may determine that the user has a higher coefficient for the airport than the gas station based on the proximity of the airport to the user.

In particular embodiments, the social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, the social-networking system 160 may provide information that is relevant to user's interests and current circumstances, increasing the likelihood that they will find such information of interest. In particular embodiments, the social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, the social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results interface than results corresponding to objects having lower coefficients.

In particular embodiments, the social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, the social-networking system 160 may calculate the coefficient (or access the coefficient information if it has previously been calculated and stored). In particular embodiments, the social-networking system 160 may measure an affinity with respect to a particular process. Different processes (both internal and external to the online social network) may request a coefficient for a particular object or set of objects. The social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503093, filed 11 Aug. 2006, U.S. patent application Ser. No. 12/977027, filed 22 Dec. 2010, U.S. patent application Ser. No. 12/978265, filed 23 Dec. 2010, and U.S. patent application Ser. No. 13/632869, filed 1 Oct. 2012, each of which is incorporated by reference.

Systems and Methods

Figure 7:
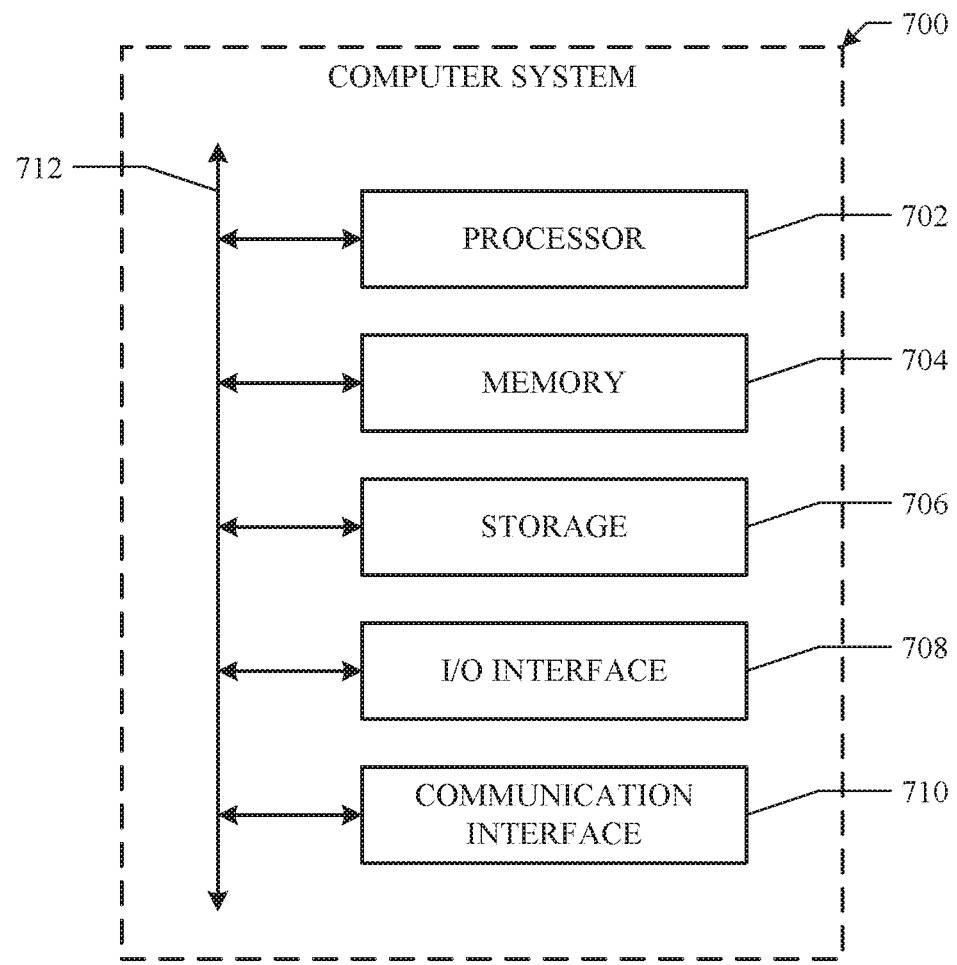
FIG. 7 illustrates an example computer system.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
    accessing a social graph comprising a plurality of nodes and a plurality of edges connecting the nodes, each of the edges between two of the nodes representing a single degree of separation between them, the nodes comprising:
        a first node corresponding to a first user associated with an online social network; and
        a plurality of second nodes corresponding to a plurality of second users of the online social network, respectively;
    identifying, for the first user, a first set of candidate-users from the plurality of second users, wherein each candidate-user corresponds to a second user within a threshold degree of separation of the first user within the social graph;
    filtering, using a first-stage filtering model, the first set of candidate-users to generate a second set of candidate-users, wherein the first-stage filtering model filters the candidate-users based on one or more edge-features;
    filtering, using a second-stage filtering model, the second set of candidate-users to generate a third-set of candidate-users, wherein the second-stage filtering model filters the candidate-users based on the one or more edge-features and one or more user-features;
    ranking, using a user-engagement model, the third set of candidate-users based on a feature superset, wherein the user-engagement model ranks the candidate-users based on a calculated probability of the first user connecting with the respective candidate-user; and
    sending, to a client system of the first user, instructions for generating a suggested-friends interface for display to the first user, wherein the suggested-friends interface comprises one or more candidate-users from the third set of candidate-users having a ranking greater than a threshold rank.

2. The method of claim 1, wherein the threshold degree of separation is two, and wherein each candidate-user in the first set of candidate-users corresponds to a second node connected by a friend-type edge to an intervening node that it connected by a friend-type edge to the first node.

3. The method of claim 1, wherein one or more edges of the plurality of edges is an inferred connection, each inferred connection being derived based on one or more of:
    contact information imported from an external system associated with one or more users of the online social network;
    communication information associated with one or more users of the online social network;
    login information associated with one or more users of the online social network; or
    social-graph information associated with one or more users of the online social network.

4. The method of claim 1, wherein one or more of the first-stage filtering model, the second-stage filtering model, or the user-engagement model is a machine-learning model generated based on an analysis of user interactions and connections with prior suggested friends.

5. The method of claim 4, wherein the machine-learning model is a gradient boosted decision tree model.

6. The method of claim 1, wherein the one or more edge-features comprise information associated with each particular pair of users, the information comprising one or more of:
    a social-graph affinity of each user in the pair of users with respect to the other user;
    an age of one or more edges connecting nodes corresponding to each user in the pair of users; or
    a level of engagement of each user in the pair of users with respect to the other user.

7. The method of claim 1, wherein the feature superset comprises:
    edge-features and user-features used during the first-stage filtering or the second-stage filtering; and
    a plurality of additional features not used during the first-stage filtering or the second-stage filtering.

8. The method of claim 7, wherein the pair of users includes:
    the first user; and
    a user corresponding to an intervening node.

9. The method of claim 7, wherein the pair of users includes:
    a user corresponding to an intervening node; and
    a candidate-user.

10. The method of claim 1, wherein the one or more user-features comprise information associated with a particular user, wherein the information comprises:
- demographic information associated with the particular user;
- an age of the particular user's account on the online social network;
- an amount of time since the particular user last accessed the online social network;
- a number of friend requests sent by the particular user;
- a number of friend requests received by the particular user;
- a number of friend requests rejected by the particular user;
- a number of pending friend requests associated with the particular user;
- a friend request acceptance rate associated with the particular user;
- a friend request rejection rate associated with the particular user; or
- an average pending time of friend requests associated with the particular user.

11. The method of claim 10, wherein the second-stage filtering model filters the candidate-users based on one or more user-features by comparing information associated with the first user to information associated with each of the candidate-users in the second set of candidate-users.

12. The method of claim 7, wherein the pair of users includes:
- the first user; and
- a candidate-user.

13. The method of claim 1, wherein the instructions for generating the suggested-friends interface are sent to a native application associated with the online social network on the client system of the first user.

14. The method of claim 1, wherein the instructions for generating the suggested-friends interface are sent to a browser client on the client system of the first user.

15. The method of claim 1, further comprising receiving a request from the first user to generate the suggested-friends interface, wherein the instructions for generating the suggested-friends interface are sent responsive to the request.

16. One or more computer-readable non-transitory storage media embodying software that is operable when executed to:
- access a social graph comprising a plurality of nodes and a plurality of edges connecting the nodes, each of the edges between two of the nodes representing a single degree of separation between them, the nodes comprising:
  - a first node corresponding to a first user associated with an online social network; and
  - a plurality of second nodes corresponding to a plurality of second users of the online social network, respectively;
- identify, for the first user, a first set of candidate-users from the plurality of second users, wherein each candidate-user corresponds to a second user within a threshold degree of separation of the first user within the social graph;
- filter, using a first-stage filtering model, the first set of candidate-users to generate a second set of candidate-users, wherein the first-stage filtering model filters the candidate-users based on one or more edge-features;
- filter, using a second-stage filtering model, the second set of candidate-users to generate a third-set of candidate-users, wherein the second-stage filtering model filters the candidate-users based on the one or more edge-features and one or more user-features;
- rank, using a user-engagement model, the third set of candidate-users based on a feature superset, wherein the user-engagement model ranks the candidate-users based on a calculated probability of the first user connecting with the respective candidate-user; and
- send, to a client system of the first user, instructions for generating a suggested-friends interface for display to the first user, wherein the suggested-friends interface comprises one or more candidate-users from the third set of candidate-users having a ranking greater than a threshold rank.

17. A system comprising: one or more processors; and a non-transitory memory coupled to the processors comprising instructions executable by the processors, the processors operable when executing the instructions to:
- access a social graph comprising a plurality of nodes and a plurality of edges connecting the nodes, each of the edges between two of the nodes representing a single degree of separation between them, the nodes comprising:
  - a first node corresponding to a first user associated with an online social network; and
  - a plurality of second nodes corresponding to a plurality of second users of the online social network, respectively;
- identify, for the first user, a first set of candidate-users from the plurality of second users, wherein each candidate-user corresponds to a second user within a threshold degree of separation of the first user within the social graph;
- filter, using a first-stage filtering model, the first set of candidate-users to generate a second set of candidate-users, wherein the first-stage filtering model filters the candidate-users based on one or more edge-features;
- filter, using a second-stage filtering model, the second set of candidate-users to generate a third-set of candidate-users, wherein the second-stage filtering model filters the candidate-users based on the one or more edge-features and one or more user-features;
- rank, using a user-engagement model, the third set of candidate-users based on a feature superset, wherein the user-engagement model ranks the candidate-users based on a calculated probability of the first user connecting with the respective candidate-user; and
- send, to a client system of the first user, instructions for generating a suggested-friends interface for display to the first user, wherein the suggested-friends interface comprises one or more candidate-users from the third set of candidate-users having a ranking greater than a threshold rank.

* * * * *